United States Patent
Mizutani et al.

(10) Patent No.: US 7,056,004 B2
(45) Date of Patent: Jun. 6, 2006

(54) SPREAD ILLUMINATING APPARATUS WITH LIGHT CONDUCTIVE PLATE HAVING POLYGONAL CONFIGURATION

(75) Inventors: Hitoshi Mizutani, Iwata-gun (JP);
Satoshi Kawashima, Iwata-gun (JP);
Toru Kunimochi, Iwata-gun (JP);
Katsuji Ishigami, Iwata-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 202 days.

(21) Appl. No.: 10/777,035

(22) Filed: Feb. 13, 2004

(65) Prior Publication Data

US 2005/0259438 A1    Nov. 24, 2005

(30) Foreign Application Priority Data

Feb. 21, 2003   (JP) .............................. 2003-044372

(51) Int. Cl.
*F21V 7/04* (2006.01)
(52) U.S. Cl. .................. 362/613; 362/612; 362/628; 362/619

(58) Field of Classification Search ................ 362/603, 362/608, 611, 612, 613, 609, 617, 621, 619, 362/236, 244, 245, 246, 252
See application file for complete search history.

(56) References Cited

U.S. PATENT DOCUMENTS 6,582,095 B1 *  6/2003  Toyoda ........................ 362/235
6,817,726 B1 * 11/2004  Nowak ........................ 362/628

FOREIGN PATENT DOCUMENTS

EP      0 962 694 A1    12/1999
EP      1 103 759 A2     5/2001
WO      WO 03/048821 A1  6/2003

* cited by examiner

*Primary Examiner*—Thomas M. Sember
(74) *Attorney, Agent, or Firm*—Oliff & Berridge, PLC

(57) ABSTRACT

In a spread illuminating apparatus comprising a spot-like light source, and a light conductive plate, the light conductive plate is shaped into a pentagon which has two sides thereof substantially parallel to each other. The pentagon includes, as a part thereof, a triangle having its base defined by an imaginary line connecting respective straightly opposing ends of the two parallel sides, and the spot-like light source is disposed at a side of the pentagon constituting one of two hypotenuses of the triangle.

7 Claims, 7 Drawing Sheets

SPREAD ILLUMINATING APPARATUS WITH LIGHT CONDUCTIVE PLATE HAVING POLYGONAL CONFIGURATION

BACKGROUND OF THE INVENTION

1. Field of the Invention

The present invention relates to a spread illuminating apparatus for use with a liquid crystal display (LCD) device, and more specifically to a spread illuminating apparatus with a light conductive plate having a configuration suitable for spreading light from a spot-like light source in a uniform manner across a display screen.

2. Description of the Related Art

A spread illuminating apparatus of side light type, which has a light source disposed so as to face one end surface of a light conductive plate, is heavily used as a subsidiary illuminating apparatus for an LCD device. In the side light type spread illuminating apparatus, the light source is shaped bar-like, for example a fluorescent lamp, and has a length substantially equal to the width of the light conductive plate, whereby the light conductive plate can be illuminated entirely in a uniform manner. In a device, such as a portable telephone, which demands low power consumption, a light emitting diode (LED) is employed as a light source. The LED is a spot-like light source and raises a problem with regard to achieving a uniform brightness across the light conductive plate.

A spread illuminating apparatus is disclosed in Japanese Patent No. 3151830, which is introduced to address the problem described above. In the spread illuminating apparatus disclosed therein, light introduced into a light conductive plate from one end surface thereof is confined within the light conductive plate before exiting out from one major surface (light exit surface) thereof. The light conductive plate has a spot-like light source disposed substantially at the center of one end surface (light entrance surface) thereof and has a light scattering pattern formed entirely across another major surface thereof opposite to the one major surface. The light scattering pattern comprises a plurality of pattern elements which each have an elongated configuration, and which are arranged at intervals therebetween with their longitudinal direction oriented substantially orthogonal to a line connecting the pattern element and the spot-like light source.

Another spread illuminating apparatus is disclosed in Japanese Patent Application Laid-Open No. 2001-357714, which is introduced also to deal with the aforementioned problem. The spread illuminating apparatus includes a light conductive plate, which has, on one major surface thereof as a light exit surface, a light emitting pattern comprising an array of inclined surfaces. A spot-like light source is disposed at at least one corner of the light conductive plate. The one corner is chamfered, and its chamfer surface is oriented substantially orthogonal to a diagonal line connecting the one corner and another corner positioned diagonally opposite to the one corner, so that light emitted from the spot-like light source, whose light emitting surface is aligned to the chamfer surface, is directed to the center area of the light conductive plate. And, the chamfer surface is rugged or roughened.

The spread illuminating apparatuses described above, however, have following problems. In the spread illuminating apparatus disclosed in Japanese Patent No. 3151830, a spot-like light source 12 is disposed at the center of a light entrance surface of a light conductive plate 11 as shown in FIG. 5, which makes it difficult for the spot-like light source 12 to illuminate an area 15 entirely with a uniform brightness. And, in the spread illuminating apparatus disclosed in Japanese Patent Application Laid-Open No. 2001-357714, a spot-like light source 12 is disposed at a chamfered corner 13 of a light conductive plate 11 as shown in FIG. 6A, which solves the above problem incurred in the spread illuminating apparatus shown in FIG. 5. However, the corner 13 is chamfered so as to direct light from the spot-like light source 12 toward the center area of the light conductive plate 11 therefore providing a lower brightness at areas K than at the center area. If another spot-like light source is disposed in the same way at a corner positioned diagonally opposite to the corner 13, the areas K are still illuminated less brightly than the center area. The problem shown in FIG. 6A can be solved by placing spot-like light sources respectively at all four corners, but this increases the number of components pushing up its manufacturing cost as well as consumes an increased electric power. Another approach to the problem is shown in FIG. 6B, where a light emitting pattern 14 is formed on one major surface 11a as a light exit surface of a light conductive plate 11, and a chamfered corner 13 has a mechanism 13a for diffusing light horizontally. The light emitting pattern 14 comprises an array of inclined surfaces having respective inclination angles in cross section ranging from 1 to 20 degrees. Since the light emitting pattern 14 is oriented substantially parallel to a surface of the chamfered corner 13, light emitted from the spot-like light source and traveling away from the center area of the light conductive plate 11 toward two corners adjacent to the corner 13 is inefficiently reflected at the inclined surfaces of the light emitting pattern 14 thus failing to effectively exit out from the one major surface 11a while light traveling toward the center area of the light conductive plate 11 is efficiently reflected at the inclined surfaces of the light emitting pattern 14 thus effectively exiting out from the one major surface 11a. Consequently, the approach is still not satisfactorily successful, despite the provision of the mechanism 13a for diffusing light horizontally, in efficiently illuminating the areas near the two adjacent corners, especially near the corner at a longer side thereby failing to provide a uniform illumination across the light conductive plate 11.

SUMMARY OF THE INVENTION

The present invention has been made in light of the above problems, and it is an object of the present invention to provide a spread illuminating apparatus, in which a light conductive plate is configured to be suitable for allowing light emitted from a spot-like light source and introduced into the light conductive plate to exit out from the light conductive plate in a uniform manner toward an illuminated object, such as an LCD screen.

In order to achieve the object, according to one aspect of the present invention, a spread illuminating apparatus comprises at least one spot-like light source, and a light conductive plate which is formed of a substantially transparent material, adapted to allow light emitted from the at least one spot-like light source and introduced thereinto to exit out from one major surface thereof, and which is shaped into a polygon. The polygon has two sides thereof substantially parallel to each other, and includes, as a part thereof, at least one triangle which has its base defined by an imaginary line connecting respective straightly opposing ends of the two parallel sides, and the light conductive plate shaped into the polygon thus defined has a spot-like light source disposed at a side thereof constituting one of two hypotenuses of the triangle.

In the aspect of the present invention, an angle formed between a line normal to the side of the polygon having the spot-like light source and one side of the two parallel sides of the polygon adjacent to the side having the spot-like light source may be calculated by a formula: {55−(Y/X)×15} degrees, where Y is a length of the one side of the two parallel sides, and X is a distance measuring between the two parallel sides.

In the aspect of the present invention, the spot-like light source may be disposed so as not to protrude beyond an extended line of the one side of the two parallel sides adjacent to the side having the spot-like light source. In the aspect of the present invention, the ratio of Y (the length of the one side of the two parallel sides) to X (the distance between the two parallel sides) may range from 1 to 2.5.

In the aspect of the present invention, the polygon may be a pentagon including, as a part thereof, one triangle which has its base defined by an imaginary line connecting respective straightly opposing ends of the two parallel sides.

In the aspect of the present invention, the polygon may be a hexagon including, as parts thereof, two triangles which are shaped identical with each other, and which are positioned and oriented symmetric about a center point of the light conductive plate whereby two sides of the hexagon each having a spot-like light source are oriented parallel to each other.

In the aspect of the present invention, the light conductive plate may have a light scattering pattern formed on at least one major surface thereof.

In the aspect of the present invention, the light scattering pattern may comprise a plurality of pattern elements staggeringly disposed in a lattice-like arrangement.

Consequently, the direction of light emitted from a spot-like light source can be optimized by appropriately determining the angle of a side which has the spot-like light source disposed thereon, whereby the corner areas of a light conductive plate can be efficiently illuminated for achieving a uniform illumination across the light conductive plate with a minimum number of spot-like light sources and therefore at a minimum power consumption. And, a combination with a light scattering pattern formed on the light conductive plate generates synergistically a further uniform illumination.

BRIEF DESCRIPTION OF THE DRAWINGS

The above and other features and advantages of the present invention will become apparent from the following description which will be given with reference to the illustrative accompanying drawings, in which.

DETAILED DESCRIPTION OF THE PREFERRED EMBODIMENTS

Figure 1A:
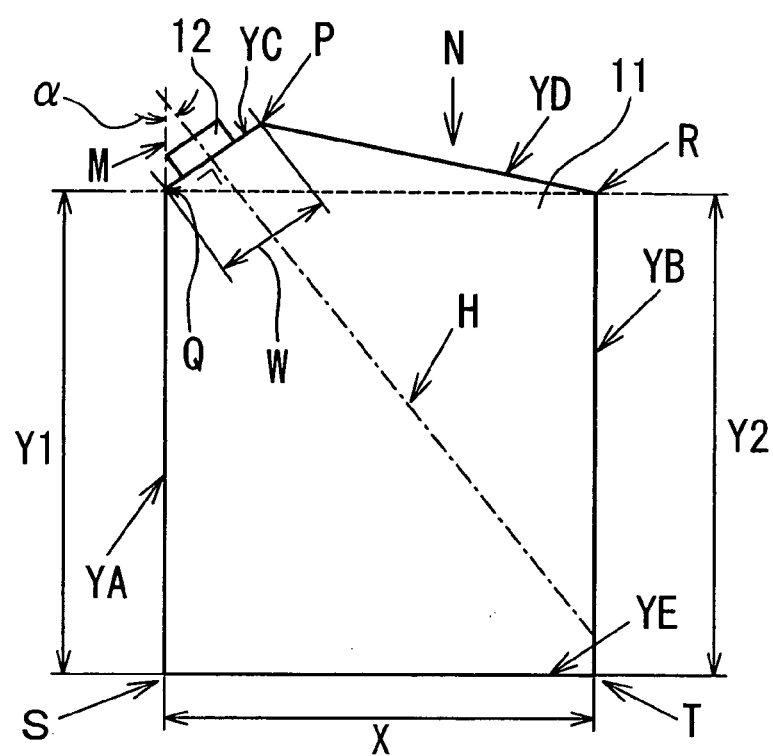
FIG. 1A is a plan view of a spread illuminating apparatus according to a first embodiment of the present invention.

A spread illuminating apparatus according to a first embodiment of the present invention will hereinafter be described with reference to FIGS. 1A and 1B. In the spread illuminating apparatus according to the first embodiment, a light conductive plate 11 has a configuration as shown in FIG. 1A in its plan view. Specifically, the light conductive plate 11 is shaped into a pentagon which defines five angles (hereinafter referred to also as "corners" as appropriate) P, Q, R, S and T, and which defines five sides (hereinafter referred to also as "side surfaces" as appropriate) YA (Q-S), YB (R-T), YC (P-Q), YD (P-R) and YE (S-T). The sides YA and YB are substantially parallel to each other with a distance therebetween equal to a length X of the side YE, and are substantially orthogonal to the side YE thereby making internal angles of the angles S and T into right angles, and the sides YC and YD respectively constitute two hypotenuses of a triangle which has its base defined by an imaginary line (indicated by a dashed line) connecting the angles Q and R, and which has its vertex defined by the angle P.

An LED 12 as spot-like light source is disposed at the side surface YC of the light conductive plate 11, and light emitted from the LED 12 is introduced into the light conductive plate 11 through the side surface YC. Respective lengths Y1 and Y2 of the sides YA and YB may be equal to each other or different from each other, but considering that an LCD device as an illuminated object is usually rectangular, it is preferred that the lengths Y1 and Y2 be dimensioned to be equal to each other. In the description of the embodiment, the lengths Y1 and Y2 are equal to each other and are noted Y in common.

A reflective member, for example, a specular reflective film having a reflectance of 85% or more, is placed over the side surfaces of the light conductive plate 11 except the side surface YC with the LED 12 so as to fully utilize light introduced in the light conductive plate 11. Specifically, the reflective film has its reflection surface preferably coated with, for example, silver or aluminum. The light conductive plate 11 functions basically as follows. Light emitted from the LED 12 and introduced in the light conductive plate 11 through the side surface YC is totally reflected repeatedly while traveling in the light conductive plate 11, and light, which falls incident on a light scattering pattern formed on one major surface (light exit surface) 11a, partly has its traveling direction changed so as to exit out from the light exit surface 11a, while light, which falls incident on another major surface (bottom surface) 11b, is reflected at a reflector plate (not shown) provided on the bottom surface 11b, is brought back into the light conductive plate 11, and eventually exits out from the light exit surface 11a. An angle a formed between the side YA and a line H normal to the side YC is calculated by a formula: {55−(Y/X)×15} degrees, and the ratio of Y to X preferably ranges from 1.0 to 2.5 but may not be limited to the range value depending on the material of the light conductive plate 11, the emitting angle distribution characteristic of the LED 12, and the configuration of the light scattering pattern. Thus, unlike the spread illuminating apparatus disclosed in Japanese Patent Application Laid-Open No. 2001-357714 in which a corner of the light conductive plate is chamfered so that light emitted from the spot-like light source is directed toward the center area of the light exit surface of the light conductive plate, in the spread illuminating apparatus of the present invention the direction of light emitted from the LED 12 as spot-like light source and traveling into the light conductive plate 11 is determined appropriately by the configuration of the light conductive plate 11 whereby the light from the LED 12 can be emitted in a uniform manner across the light conductive plate 11.

The LED 12 disposed at the side surface YC is positioned so as not to protrude beyond a line M extended from the side YA, whereby the spread illuminating apparatus has a width not exceeding the length X of the side YE. A length W of the side YC is not strictly defined, as long as the LED 12 including a soldering space can be disposed as described above.

Figure 7:
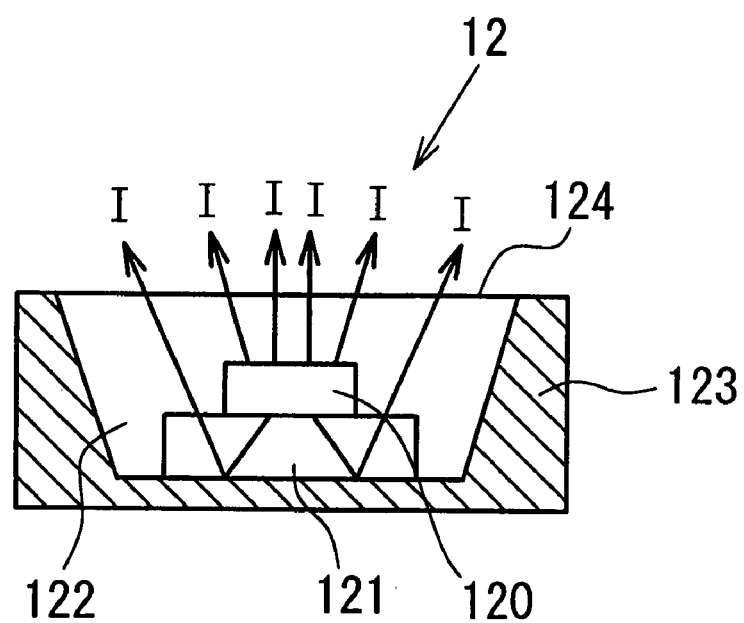
FIG. 7 is a schematic cross sectional view of a light emitting diode (LED).

The LED 12 as spot-like light source is structured, for example, such that an InGaN blue LED chip 120 placed on a transparent base 121 is put in a case 123 and entirely covered up by YAG fluorescent material 122 as shown in FIG. 7. Blue light emitted from the blue LED chip 120 mixes with yellow light emitted from the YAG fluorescent material 122 excited by the blue LED chip 120, whereby white light I is emitted from a light emitting surface 124 which is in contact with the side surface YC of the light conductive plate 11. The LED 12 may alternatively comprise, for example, an InGaN ultraviolet LED chip and white fluorescent material so as to emit white light.

Figure 1B:
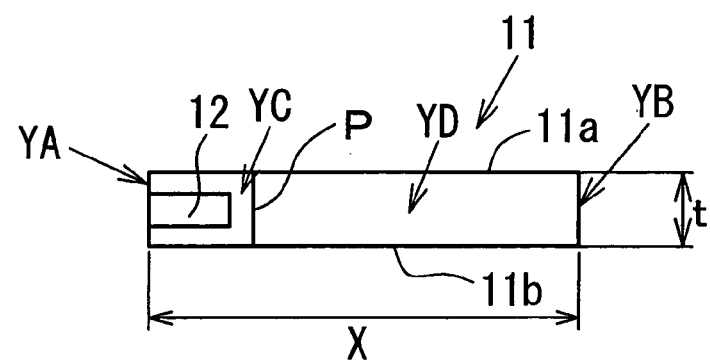
FIG. 1B is a side view of the spread illuminating apparatus of FIG. 1A in a direction N.

The light conductive plate 11 is formed of a transparent resin material with a high refractive index, such as polycarbonate or methacrylic resin, and has, in FIG. 1B, a constant thickness t with respect to a light traveling direction, but may alternatively have a thickness gradually decreasing with an increase in distance from the LED 12 so as to form a wedge-shaped cross section. Also, the light exit surface 11a and the bottom surface 11b of the light conductive plate 11 may be provided with a light scattering pattern which is formed by roughening, or dot printing with diffusive reflection ink.

Figure 2:
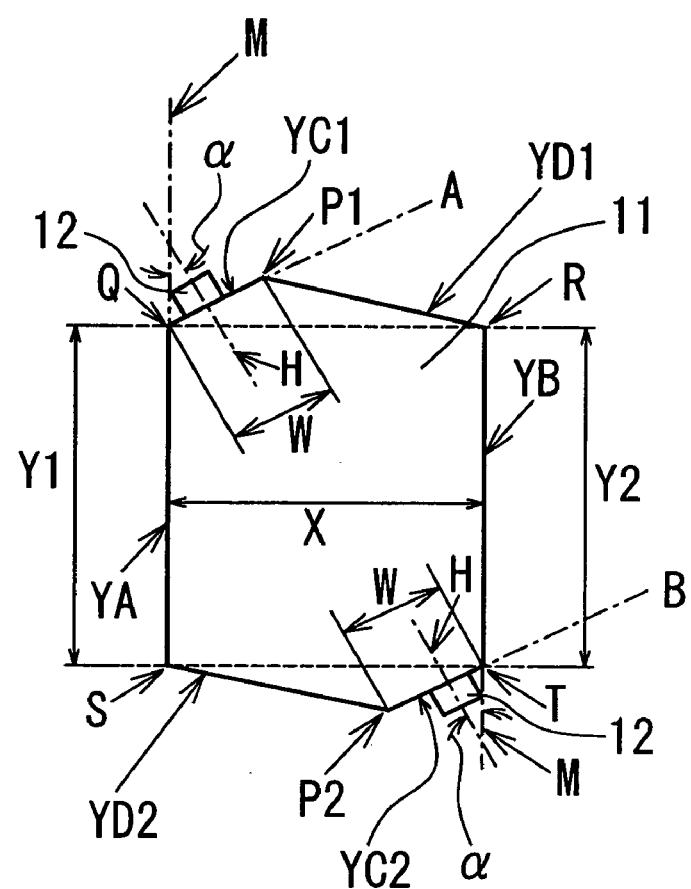
FIG. 2 is a a top plan view of a spread illuminating apparatus according to a second embodiment of the present invention.

A spread illuminating apparatus according to a second embodiment of the present invention will hereinafter be described. Referring to FIG. 2, the spread illuminating apparatus according to the second embodiment has a light conductive plate 11 shaped into a hexagon, which defines six angles (hereinafter referred to also as "corners" as appropriate) P1, P2, Q, R, S and T, and which defines six sides (hereinafter referred to also as "side surfaces" as appropriate) YA (Q-S), YB (R-T), YC1 (P1-Q), YD1 (P1-R), YC2 (P2-T) and YD2 (P2-S), and in which the sides YA and YB are substantially parallel to each other with a distance X therebetween. The hexagon includes two triangles as parts thereof, one (upper side in the figure) of which is formed such that the sides YC1 and YD1 respectively constitute two hypotenuses, an imaginary line (indicated by a dashed line) connecting the angles Q and R constitutes a base, and the angle P1 constitutes a vertex, and the other (lower side in the figure) of which is formed upside down such that the sides YC2 and YD2, and an imaginary line (indicated by a dashed line) connecting the angles S and T respectively constitute three sides, and the angle P2 constitutes a vertex facing downward. In this connection, since an LCD device usually has a rectangular shape, the sides YA and YB have their respective lengths Y1 and Y2 preferably set equal to each other (Y1=Y2, and referred to as Y in common).

The aforementioned two triangles are shaped identical with each other, and positioned and oriented symmetric about the center point of the light conductive plate 11. The side surfaces YC1 and YC2 of respective triangles are parallel to each other and respectively have first and second LED's 12 as spot-like light source disposed thereon. Since the two LED's 12 are disposed so as to diagonally oppose each other, the spread illuminating apparatus according to the second embodiment is especially suitable when the ratio of the length Y to the distance X is larger than 2.5 and when a brighter illumination with an enhanced uniformity needs to be provided across the light conductive plate 11. An angle a formed between the side YA and a line H normal to the side YC is calculated by a formula: {55−(Y/X)×15} degrees.

The first and second LED's 12 disposed respectively at the side surfaces YC1 and YC2 are positioned so as not to protrude beyond respective lines M extended from the sides YA and YB, whereby the spread illuminating apparatus has a width not exceeding the distance X measuring between the sides YA and YB. A length W of the side YC1/YC2 is not strictly defined, as long as the LED's 12 including a soldering space can be disposed as described above.

Figure 3:
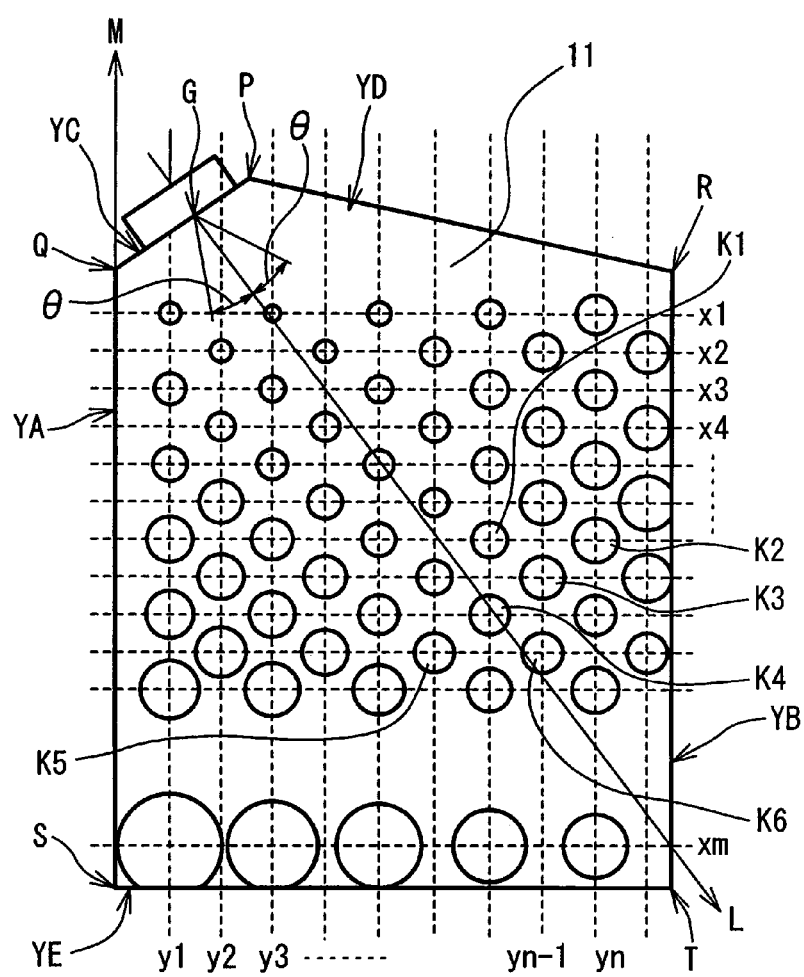
FIG. 3 is an explanatory top plan view of a spread illuminating apparatus according to a third embodiment of the present invention.

A spread illuminating apparatus according to a third embodiment of the present invention will hereinafter be described. Referring to FIG. 3, a light conductive plate 11 of the spread illuminating apparatus according to the third embodiment is shaped same as in the first embodiment, but has a light scattering pattern formed on a light exit surface 11a (refer to FIG. 1B) thereof. The light scattering pattern comprises a plurality of, for example, circular convex dots Kn as pattern elements. In FIG. 3, for ease of understanding, the number and size of the dots Kn of the light scattering pattern are different from those which are actually determined by experiment depending on the size of the light conductive plate 11 and the luminance of the LED 12.

The dots Kn are located in a staggered manner at intersection points formed by imaginary lines xm and yn (m and y represent integers) parallel to sides YA/YB and YE, respectively. The circular convex dots Kn have their diameters increasing with an increase in distance from a center point G of the LED 12 and also increasing with an increase in angle θ with respect to an imaginary line L originating from the center point G of the LED 12 and orthogonal to the light emitting surface of the LED 12. Specifically, taking dots K4, K5 and K6 as comparing examples, the dot K6 disposed on the imaginary line L has a larger diameter than the dot K4 which is also disposed on the imaginary line L but closer to the center point G of the LED 12, and the dot K5, which is disposed at a location with the same distance away from the center point G as the dot K4 but with a larger angle θ than the dot K4, has a larger diameter than the dot K4.

The light scattering pattern is structured as described above considering the fact that light emitted from the LED 12 has its intensity decreasing with an increase in angle θ with respect to the imaginary line L and decreasing with an increase in distance from the center point G of the LED 12, whereby the light emitted from the LED 12 and introduced in the light conductive plate 11 can exit out from the light exit surface 11a in a further uniform manner across the light conductive plate 11, independent of the distance and light emitting angle. Also, since the dots are staggeringly disposed in a lattice-like arrangement rather than an arced arrangement, a mask for forming a light scattering pattern can be produced very easily.

Figures 4A, 4B:
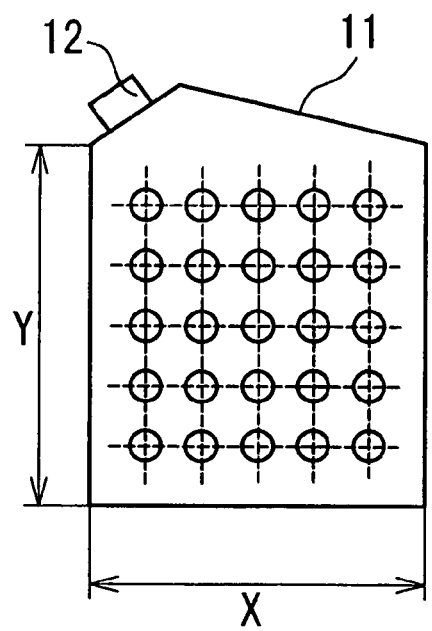
FIG. 4A is a top plan view of the illuminating apparatus according to the third embodiment, showing spots where brightness is measured on a light conductive plate.
FIG. 4B shows measurement results at the spots of FIG. 4A.
Figure 5:
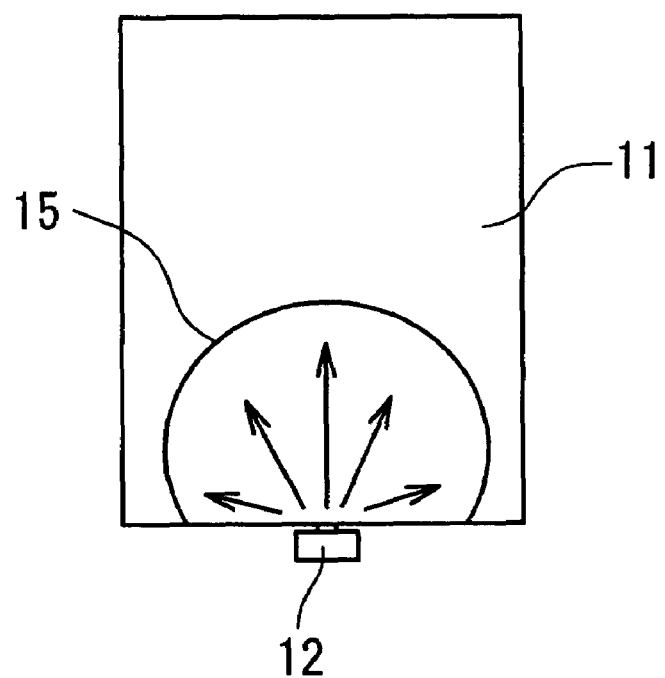
FIG. 5 is an explanatory top plan view of one conventional spread illuminating apparatus.
Figure 6A:
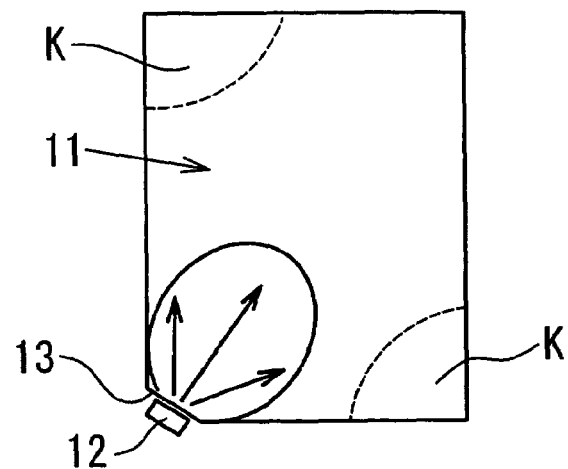
FIGS. 6A and 6B are explanatory top plan views of another conventional spread illuminating apparatus.
Figure 6B:
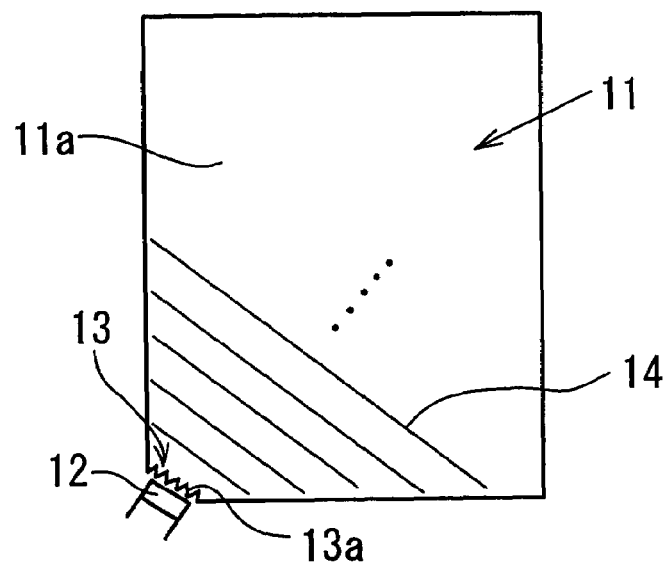

FIGS. 4A and 4B show spot by spot brightness across the light conductive plate 11 of the spread illuminating apparatus according to the third embodiment. In FIG. 4A, the lengths Y1 and Y2 of the sides YA and YB are equal (Y) to each other, the ratio of the length Y to the distance X is 4:3, and the angle α (refer FIG. 1A) is 35 degrees. As known from FIG. 4B, the ratio of the lowest brightness to the highest brightness is 0.88, which falls within practically acceptable limits.

In connection with the third embodiment, a light scattering pattern may be applied to the spread illuminating apparatus according to the second embodiment, which has two spot-like light sources disposed so as to oppose each other. In this case, the light scattering pattern consists of two sections patterned symmetric about the center point of the light conductive plate.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A spread illuminating apparatus comprising:
   at least one spot-like light source; and
   a light conductive plate formed of a substantially transparent material, and adapted to allow light emitted from the at least one spot-like light source and introduced thereinto to exit out from one major surface thereof, the light conductive plate being shaped into a polygon which has two sides thereof substantially parallel to each other, and includes, as a part thereof, at least one triangle having its base defined by an imaginary line connecting respective straightly opposing ends of the two parallel sides, and which has a spot-like light source disposed at a side thereof constituting one of two hypotenuses of the triangle,
   wherein an angle formed between a line normal to the side of the polygon having the spot-like light source and one side of the two parallel sides of the polygon adjacent to the side having the spot-like light source is calculated by a formula:

$$55 - (Y/X) \times 15 \text{ degrees}$$

where Y is a length of the one side of the two parallel sides, and X is a distance between the two parallel sides.

2. A spread illuminating apparatus according to claim 1, wherein the spot-like light source is disposed so as not to protrude beyond an extended line of one side of the two parallel sides of the polygon adjacent to the side having the spot-like light source.

3. A spread illuminating apparatus according to claim 1, wherein a ratio of the length Y to the distance X ranges from 1 to 2.5.

4. A spread illuminating apparatus according to claim 1, wherein the polygon is a pentagon including, as a part thereof, one triangle which has its base defined by an imaginary line connecting respective straightly opposing ends of the two parallel sides.

5. A spread illuminating apparatus according to claim 1, wherein the light conductive plate has a light scattering pattern formed on at least one major surface thereof.

6. A spread illuminating apparatus according to claim 5, wherein the light scattering pattern comprises a plurality of pattern elements staggeringly disposed in a lattice-like arrangement.

7. A spread illuminating apparatus comprising:
   at least one spot-like light source; and
   a light conductive plate formed of a substantially transparent material, and adapted to allow light emitted from the at least one spot-like light source and introduced thereinto to exit out from one major surface thereof, the light conductive plate being shaped into a polygon which has two sides thereof substantially parallel to each other, and includes, as a part thereof, at least one triangle having its base defined by an imaginary line connecting respective straightly opposing ends of the two parallel sides, and which has a spot-like light source disposed at a side thereof constituting one of two hypotenuses of the triangle,
   wherein the polygon is a hexagon including, as parts thereof, two triangles which are shaped identical with each other, and which are positioned and oriented symmetric about a center point of the light conductive plate whereby two sides of the hexagon each having a spot-like light source are oriented parallel to each other.

* * * * *